United States Patent [19]

Malinowski

[11] Patent Number: 4,509,107

[45] Date of Patent: Apr. 2, 1985

[54] SEALED BEAM LAMP UNIT AND METHOD FOR AN IMPROVED SEALED EXHAUST HOLE

[75] Inventor: Richard F. Malinowski, Chesterland, Ohio

[73] Assignee: General Electric Company, Schenectady, N.Y.

[21] Appl. No.: 546,011

[22] Filed: Oct. 27, 1983

[51] Int. Cl.³ .............................. H01K 3/26; H01J 9/00
[52] U.S. Cl. ..................................... 362/267; 156/275.5; 313/113; 362/296; 362/341; 445/43; 445/44
[58] Field of Search ............... 362/61, 80, 83, 158, 362/263, 264, 267, 294, 296, 307, 308, 310, 311, 341, 345, 373, 374, 375; 313/113, 634; 445/3, 26, 43, 44; 156/69, 275.5, 275.7; 141/65; 350/343

[56] References Cited

U.S. PATENT DOCUMENTS

| | | | |
|---|---|---|---|
| 3,010,045 | 11/1961 | Plagge et al. | 445/44 X |
| 3,147,053 | 9/1964 | Phelps et al. | 445/43 |
| 3,153,839 | 10/1964 | Pakswer et al. | 445/44 X |
| 3,587,167 | 6/1971 | Levin | 313/113 X |
| 3,725,698 | 4/1973 | Craig | 313/113 X |
| 3,826,634 | 7/1974 | Blust et al. | 445/43 X |
| 3,898,451 | 8/1975 | Murphy et al. | 362/267 X |
| 4,030,789 | 6/1977 | Schampers et al. | 445/44 X |
| 4,146,812 | 3/1979 | Gagnon | 313/113 |
| 4,180,755 | 12/1979 | Nixon | 313/113 |
| 4,210,841 | 7/1980 | Vodicka et al. | 362/267 X |
| 4,238,704 | 12/1980 | Bonk et al. | 313/113 |
| 4,272,589 | 6/1981 | Dubois et al. | 156/275.5 X |
| 4,302,697 | 11/1981 | Demas et al. | 445/44 X |
| 4,310,772 | 1/1982 | Tyler et al. | 445/43 X |
| 4,429,249 | 1/1984 | Tyler et al. | 313/113 |

FOREIGN PATENT DOCUMENTS 479258  2/1938  United Kingdom ............... 362/267

Primary Examiner—David H. Brown
Assistant Examiner—John E. Griffiths
Attorney, Agent, or Firm—John P. McMahon; Philip L. Schlamp; Fred Jacob

[57] ABSTRACT

A sealed beam headlamp unit having an improved sealed exhaust hole is disclosed. Further disclosed is a method of applying the seal of the exhaust hole.

10 Claims, 8 Drawing Figures

STEP (a)

STEP (b)

STEP (c)

STEP (d)

SEALED BEAM LAMP UNIT AND METHOD FOR AN IMPROVED SEALED EXHAUST HOLE

The present invention relates to a sealed glass beam lamp unit which has particular utility for automobile headlamps. More particularly, the present invention relates to a glass sealed beam lamp unit having an improved seal for the exhaust hole of the lamp unit and a method of applying the improved seal.

Sealed beam headlamp units are well known and one such sealed beam headlamp unit is described in U.S. patent application Ser. No. 504,202, of Shanks, filed June 14, 1983 and which is assigned to the same assignee as the present invention. Such a unit has a filament assembly which serves as a light source and is internally arranged within the unit. The filament assembly is predeterminedly located at a desired optical position within the unit. The filament is connected across ferrules, which, in turn, are connected to mating contact plugs or electrical terminals. The electrical terminals are connected to suitable electrical connectors, within the automobile, through which the filament is selectively energized in accordance with the switching devices within the automobile.

The sealed beam headlamp unit has an exhaust hole which serves as a means to ventilate the interior of the sealed lamp during the manufacturing processing of the lamp. One of the final steps of the manufacturing processing is sealing the exhaust hole. The sealing step of the exhaust hole may need to be accomplished during adverse sealing conditions such as, at a condition when the temperature of the lamp unit is in an elevated state.

At this elevated temperature condition, the allowable time duration for applying the sealing compound to the exhaust hole until curing of the sealing compound occurs is very limited. For example, if the lamp has an elevated temperature of 140° F. the curing of the sealing compound needs to be accomplished within 30 seconds after the sealing compound is applied to the exhaust hole otherwise a leak in the sealed exhaust hole may occur. If the elevated temperature of the lamp is 225° F., the necessary time duration from the application to the curing of sealing compound of the exhaust hole may be 10 seconds. In spite of such adverse conditions, the sealed exhaust hole of seal headlamp unit when placed within its intended environment, such as that which is encountered by an automobile, must be capable of withstanding relatively humid, severe hot and cold climate conditions without rupturing otherwise the sealed beam headlamp unit will not be able to serve its intended purpose.

Accordingly, it is an object of the present invention to provide an improved sealant for an exhaust hole of a glass sealed beam headlamp unit capable of being applied to a sealed beam lamp unit under relatively hot and adverse sealing conditions and also capable of withstanding relatively severe climate conditions when placed within and subjected to an automobile environment.

It is a further object of the present invention to provide a method of applying the improved seal of the exhaust hole of the glass sealed beam headlamp unit.

SUMMARY OF THE INVENTION

The present invention is directed to a sealed beam headlamp unit having an exhaust hole containing an improved sealant arrangement and methods of applying the improved sealant arrangement to the exhaust hole. In one embodiment during the manufacture of the present invention, a sealed beam headlamp unit comprises a reflector, an incandescent light source located at the focal point of the unit and connected across a pair of metal ferrules which are respectively connected to a pair of electrical terminals. The reflector further comprises a region defining a passageway which serves as an exhaust hole for said unit during manufacture and a composite arrangement for sealing the passageway. The composite sealing arrangement comprises a quantity of ultraviolet light curable material substantially filling the passageway, and an ultraviolet light-transmissive cover member extending over the outer end of the passageway. The light-transmissive material is bondable to the plastic material and to the rim of the passageway upon curing of the plastic material. In a second embodiment of the present invention after the curing process of the manufacture the composite sealing arrangement comprises a solid plug of cured plastic substantially filling and adhering to the walls of the passageway and joined to a polymeric material cover member. The cover member is adhered to the outer rim of the passageway. It is preferred that the cured plastic be bonded to polymeric material cover member. Still further, the present invention comprises a method of applying the ultraviolet light cured plastic to the passageway and bonding the light-transmissive cover member over the outer end of the passageway.

The features of the invention believed to be novel are set forth with particularly in the appended claims. The invention, itself, however, as regards its structure, methods and advantages thereof, may best be understood with reference to the following description taken in conjunction with the accompanying drawings.

DETAILED DESCRIPTION OF THE PREFERRED EMBODIMENTS

Figure 1:
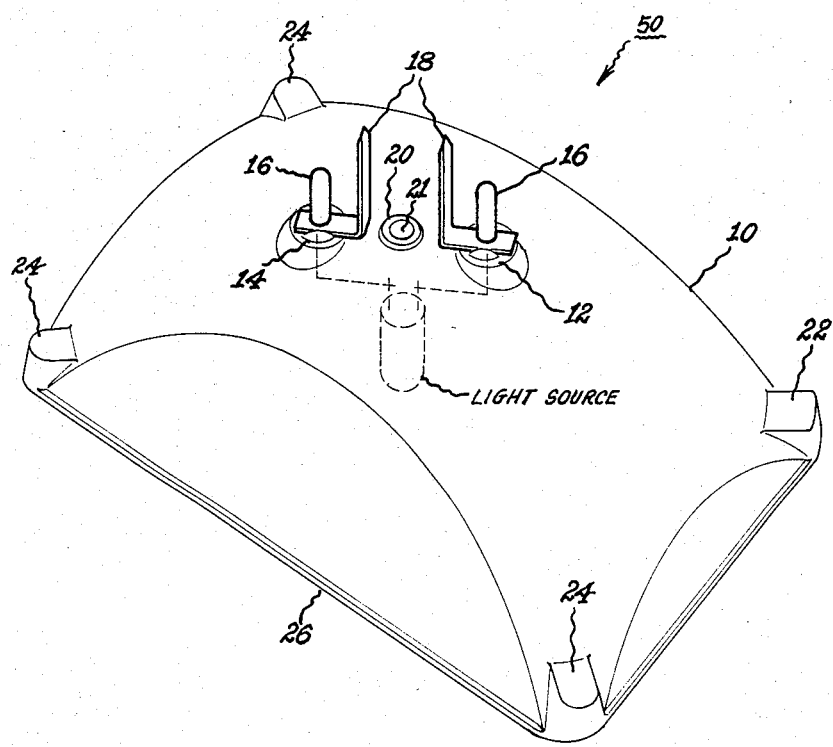
FIG. 1 is a perspective view illustrating one embodiment of the present invention showing a rectangular sealed beam headlamp unit.

The unit illustrated in FIG. 1 comprises a rectangular glass sealed beam headlamp unit 50 constructed in accordance with one embodiment of the present invention and having particular utility for automobile headlamps. The unit 50 comprises, in part, a dome-shaped reflector 10 and a slightly flared rectangular peripheral rim 26. Although the unit 50 of FIG. 1 is illustrated without a lens applied, it should be recognized that the practice of this invention contemplates a combined glass reflector and lens construction or, alternatively, a unitary sealed headlamp unit described in U.S. Pat. No. 4,210,841, entitled "All Plastic Headlamps."

The reflector 10 of FIG. 1 has four (4) sealing pads one of which is a keying pad 22 and the remaining three of which are similar but non-keyed and are indicated by reference number 24. The four sealing pads when positioned into complementary sealing surfaces on an automobile and suitably affixed thereto, allow the illumination created by the headlamp unit to be focused in a direction determined by the orientation of the automobile.

The reflector of FIG. 1 further includes electrical terminal locating means 12 and 14 positioned equally spaced on opposite sides of a region 20 having a passageway 21. The locating means 12 and 14 are provided in bosses formed on the outer walls of the reflector about passageway 32 (shown in FIG. 2) extending through the boss and the reflector through which metal ferrules 16 extend. The metal ferrules 16 are electrically connected to terminals 18 by an appropriate pressing action. The electrical terminals 18 provide for a reliable interconnection with the electrical circuit of the vehicle in which the seal beam headlamp unit is utilized. The locating means 12 and 14 of the lamp 50 may be of the type described in the previously mentioned U.S. patent application Ser. No. 504,202.

Figure 2:
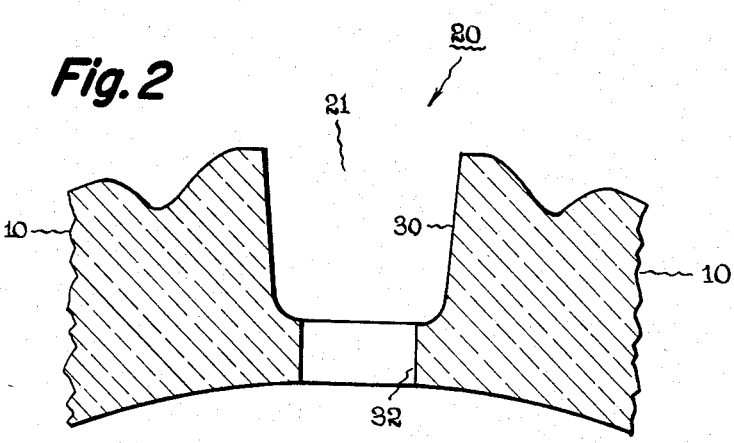
FIG. 2 is a fragmentary sectional view showing the unoccupied exhaust hole of the lamp of FIG. 1.

The region 20 of lamp 50 is shown in its unoccupied condition in FIG. 2. The passageway 21 of the region 20 has an upper portion 30 and a lower portion 32 both of which define an exhaust hole to serve as a means to ventilate the interior of the lamp 50 during manufacturing processing of lamp 50. The upper portion 30 and the lower portion 32 of passageway 21 are shown in their occupied condition in FIG. 3(d) which is to be further discussed hereinafter with regard to the preferred method of this invention.

The plastic material 34 has a viscosity property and may be an acrylic, acrylic-modified or other similar polymeric material curable by the application of ultraviolet light. The plastic material 34 is commercially available from Loctite Company of Connecticut, U.S.A.

The material 36 may be a polyvinyl chloride (PVC) composition having an ultraviolet light-transmissive property, and is commercially available from Technical Plastic Extruders Company of New Jersey, U.S.A. The light-transmissive material 36 has a typical thickness of about 15 mils. Other thicknesses of material 36 can be used depending on the amount of ultraviolet light applied during the curing process to be further discussed.

In general, the cured plastic 34 in combination with the light-transmissive piece of material 36 provides a composite arrangement for sealing the sealed beam 50 exhaust hole formed of portions 30 and 32 of passageway 21. During the manufacture of the sealed beam headlamp the composite sealing arrangement comprises a quantity of the ultraviolet curable plastic material 34 substantially filling the passageway 31, and the ultraviolet light-transmissive material 36 which forms a cover member extending over the outer end of the passageway 21 and is preferably bondable to the plastic material 34. The cover member 36 is also preferably bonded to the rim of the passageway 31. The bonding of the cover member 36 to the passageway 21 and to the plastic material 34 occurs after the application of ultraviolet light.

After the application of the ultraviolet light the composite arrangement sealing of the passageway of the final sealed beam headlamp unit 50 of FIG. 1 comprises a solid plug of cured plastic material 34 substantially filling and adhering and preferably bonding to the walls of the passageway 21. The cured plastic material 34 is joined and preferably bonded to polymeric material cover member 36. The cover member 36 is adhered and preferably bonded to the outer rim of the passageway 21.

The viscous ultraviolet light curable plastic 34 is applied to the region 20 having the passageway or exhaust hole 21. The light-transmissive piece of material 36 is pressed onto and may or may not lodge within the passageway 21 and is effective to cause the plastic 34 to fill the passageway 21. The plastic 34 exudes out of the passageway 21 and out from under the material 36 to form a bead seal between the material 36 and the glass of the lamp unit 50. The seal of the passageway 21 is provided by the curable plastic 34 in further cooperation with the light-transmissive material 36.

The manner or method in which the curable plastic 34 and the light-transmissive material 36 is mated onto and preferably somewhat into the passageway 21 may be described with reference to FIGS. 3(a)–3(d).

FIGS. 3(a), 3(b), 3(c), and 3(d) are meant to respectively illustrate four STEPS a, b, c and d for mating the curable plastic 34 and the light-transmissive material 36 onto and preferably somewhat into the passageway 21 of lamp 50. As discussed in the "Background" section, the lamp 50 may typically experience an elevated temperature during its desired sealing step involved in its manufacturing process. As further discussed, for an elevated temperature condition of e.g., 225° F., the allowable duration to completely accomplish the sealing process may be undesirably restricted to 10 seconds. The present invention eliminates this undesirable restricted sealing duration.

Figure 3A:
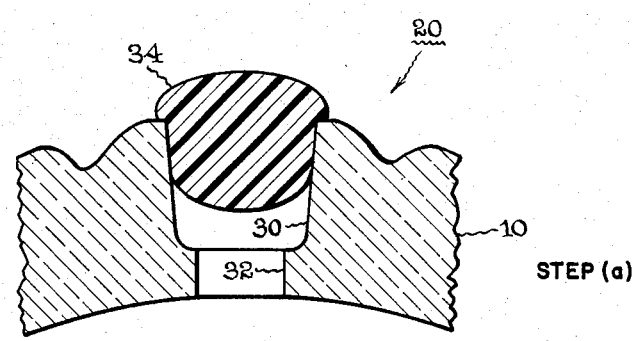
FIGS. 3(a) through 3(d) illustrate one method of accomplishing the sealing of the exhaust hole of the lamp of the present invention.

FIG. 3(a) shows STEP (a) in which a predetermined amount of the plastic material 34 is applied to the upper surface of region 20 in the form of a blob and due to the viscosity of material 34 flows downward and into the upper portion 30 of passageway 21. The plastic material 34 may be applied to the region 20 of sealed headbeam lamp unit 50 at room temperature and even up to an elevated temperature condition of the lamp of about 325° F.

Figure 3B:
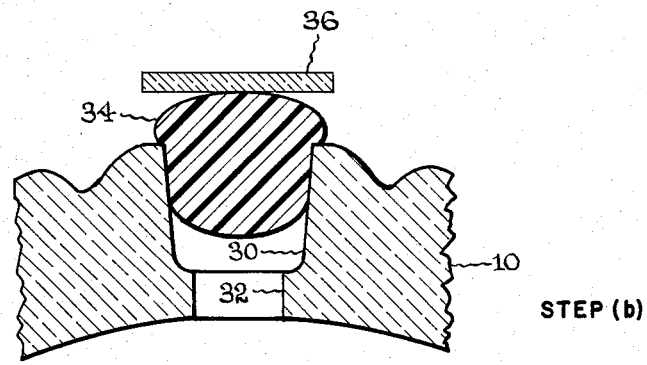

FIG. 3(b) shows STEP (b) in which the light-transmissive material 36 is placed onto the applied plastic material 34. The thickness of the light-transmissive material 36 is shown in FIG. 3(b), and also FIGS. 3(c) and (d), in an enlarged manner.

Figure 3C:
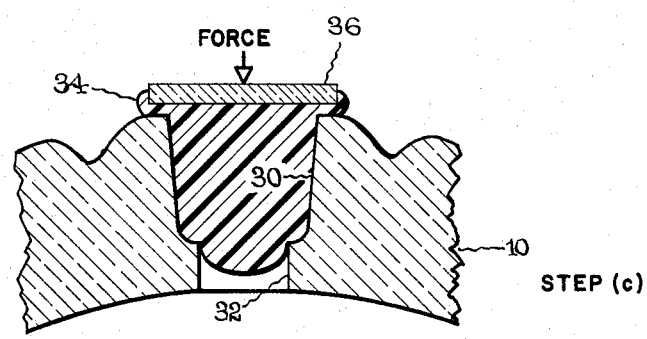

FIG. 3(c) shows STEP(c) in which the light-transmissive material 36 is being forced downward onto the plastic material 34 by external means, which, in turn, causes the plastic material 34 to more easily move downward through upper portion 30 and into a substantial majority of the lower portion 32. Further, the force applied to the light-transmissive material 36 causes the plastic material 34 to exude out of passageway 21 and also out from under the light-transmissive material 36. The plastic material 34 forms around the sides of the light-transmissive material 36. The light-transmissive material 36 shown in FIG. 3(c) is not yet in intimate contact with the upper surface of the reflector 10 of lamp 50. A pressure differential resulting from internal gas cooling between the interior and exterior of the lamp 50 being processed, causes a major portion of the light-transmissive material 36 to be drawn downward into the passageway 21 and also causes the side portions of the light-transmissive material 36 to intimately mate with the upper surface of the reflector 10 by way of a thin coating of the plastic 34. The pressure differential also causes the plastic material 34 to be further drawn into the lower portion 32 as shown in FIG. 3(d).

Figure 4A:
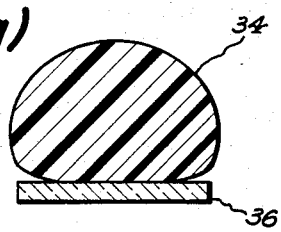
FIGS. 4(a) and 4(b) illustrate alternative steps related to the method of FIGS. 3(a)–3(d).

A modification to method of steps (b) and (c) is to first apply the plastic 34 to the material 36 (as shown in FIG. 4(a)) and then press both plastic 34 and material 36

Figure 4B:
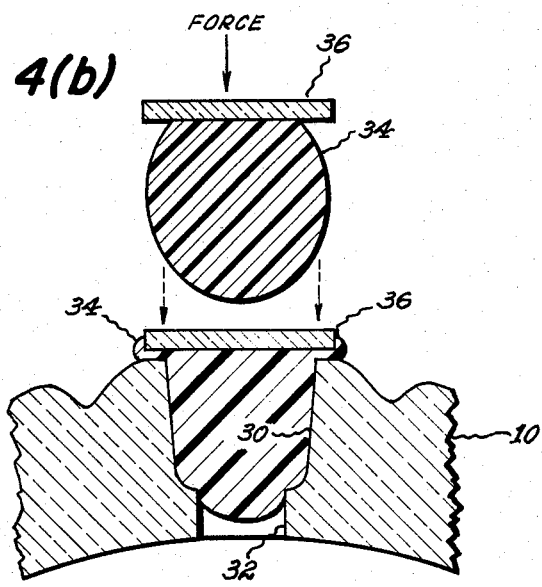

(as shown in FIG. 4(b)) at the same time into the passageway 21.

Figure 3D:
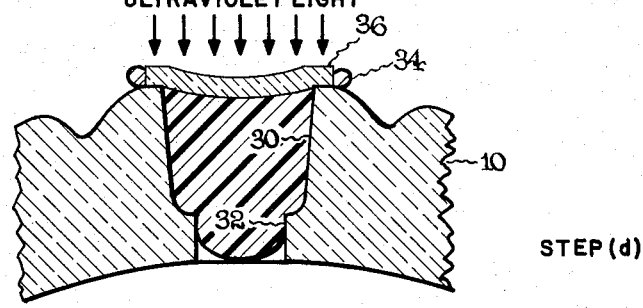

The final step (d) of the mating process of the present invention is shown in FIG. 3(d) in which ultraviolet light is applied to the light-transmissive material 36 and to the plastic material 34. The ultraviolet light is applied for a period of about 30 seconds. The ultraviolet light cures the plastic material 34, seals the passageway 21 and bonds or lodges the light-transmissive material 36 onto and somewhat into the passageway 21.

The light-transmissive material 36 during the processing steps (c) and (d) acts as a temporary seal preventing the pressure differential between the interior and exterior of lamp 50 from sucking the plastic material 34 into the interior lamp 50 which would otherwise cause a leak in the seal of exhaust hole 21 to occur later during lamp cooling. Further, if any of the plastic material 34 was allowed to find its way into the interior of the lamp 50, it would detrimentally affect the optical performance of the lamp 50.

Further, the present invention by the use of the light-transmissive material 36 allows for a wide range of viscosity properties of the plastic ultraviolet curable material 34. Plastic materials 34 having an especially high viscosity may be used for sealing passageway 21 since the light-transmissive material 36 acts as a mechanical aid to properly distribute the plastic material 34 within and outside of the passageway 21 during its sealing. Otherwise the material 34 would not properly cover or fill the passageway 21. Similarly, the light-transmissive material 36 by providing a temporary seal which retards the flow of plastic material 34 allows for the use of plastic ultraviolet curable material having a relatively low viscosity. This prevents the material 34 from running away from or through the passageway 21.

The distributing of the plastic material 34 into the passageway 21 by the light-transmissive material 36 results in the passageway being completely filled with a sealant that is void of any channels. The plastic material 34 outside the passageway extrudes onto the light-transmissive material 36 and a bead seal is formed between the glass of the sealed beam unit 50 and the light-transmissive material 36.

A further advantage of the use of the light-transmissive material 36 and the ultraviolet cured plastic material 34 is that a better seal between the light-transmissive material and the glass of lamp 50 is provided as compared to a seal that would result if the plastic material 34 was only applied to the passageway 21. Further the light-transmissive material 36 allows the ultraviolet light to penetrate and completely cure the plastic material 34 underneath it during the described processing STEP (d) of FIG. 3(d).

A primary feature of the present invention is that the hereinbefore described limited time duration in the order of seconds, from applying the sealing compound to the application of the ultraviolet curing light is substantially increased and even effectively eliminated. In accordance with the practice of this invention, a composite sealing arrangement comprised of the light-transmissive material 36 and the plastic material 34 in its uncured state was installed in the passageway 21 of a sealed beam headlamp unit. The passageway 21 of the headlamp unit was left in its uncured state for a period of approximately 10 hours and leak in the seal did not occur. Such an increase from the application of sealing arrangement to the application of the needed application of the curing ultraviolet light is obtained by the temporary seal provided by the light-transmissive material 36 in cooperation with the uncured plastic material 36.

In accordance with the practice of this invention exhaust hole 21 of the lamp 50 was sealed with the ultraviolet curable plastic 34 and the light-transmissive material 36. The lamp 50 was then, (1) boiled in water for 10 minutes, (2) cooled to a temperature of −40° F. for approximately 10 hours, and (3) elevated to a temperature of about 120° F. at a relative humidity of about 96 percent for a period of approximately 14 hours. The testing steps were sequentially repeated ten (10) times. The lamp 50 encountered such testing without experiencing a leak in its sealed passageway 21.

It should now be appreciated that the practice of the present invention provides for an improved sealed passageway or exhaust hole formed of sealant members 34 and 36 and methods of applying such improved sealant to such exhaust holes.

What I claim as new and desire to secure by Letters Patent of the United States is:

1. A method of sealing an exhaust hole of a sealed beam headlamp unit comprising the steps of:
   (a) applying a predetermined amount of viscous ultraviolet light curable plastic in the form of a blob onto a piece of light-transmissive material,
   (b) forcing both the curable plastic and the light-transmissive material into a region defining said exhaust hole, and
   (c) applying ultraviolet light onto said piece of light-transmissive material effective to harden said plastic within said exhaust hole and effective to bond said piece of light-transmissive material to said curable plastic.

2. A method of sealing an exhaust hole of a sealed beam headlamp unit comprising the steps of:
   (a) applying a predetermined amount of viscous ultraviolet light curable plastic in the form of a blob onto an outer surface of a region defining said exhaust hole;
   (b) placing a piece of light-transmissive material onto the curable plastic;
   (c) forcing the light-transmissive material downward which causes the viscous curable plastics to more easily flow into the exhaust hole; and
   (d) applying ultraviolet light onto said piece of light-transmissive material effective to harden said plastic within said exhaust hole and effective to bond said piece of light-transmissive material to said curable plastic.

3. A method of sealing an exhaust hole according to claim 2 wherein said applied curable plastic has a relatively wide range of viscosity.

4. A method of sealing an exhaust hole according to claim 2 wherein said curable plastic is applied to a seal beam headlamp unit having a temperature up to about 325° F.

5. In the sealed beam headlamp unit comprising a reflector, an incandescent light source located at the focal point of the unit and connected across a pair of metal ferrules which are respectively connected to a pair of electrical terminals, said reflector further comprising:
   a region defining a passageway which serves as an exhaust hole for said unit during manufacture;
   a composite arrangement for sealing said passageway comprising;

a quantity of ultraviolet light curable plastic material substantially filling said passageway, and an ultraviolet light-transmissive cover member extending over an outer end of said passageway and being bondable to said plastic material and to a rim of said passageway upon curing of said plastic material, and;

said cover member preventing said ultraviolet curable plastic material in its uncured state from being sucked into interior of said reflector.

6. In a sealed beam headlamp unit comprising a reflector, an incandescent light source located at the focal point of the unit and connected across a pair of metal ferrules which are respectively connected to a pair of electrical terminals, said reflector further comprising:

a region defining a passageway which serves as an exhaust hole for said unit during manufacture, a composite arrangement sealing said passageway comprising:

a solid plug of cured plastic substantially filling and adhering to walls of said passageway and joined to a polymeric material cover member, said cover member adhered to an outer rim of said passageway, and;

said cover member preventing said cured plug plastic in its uncured state from being sucked into interior of said reflector.

7. In a sealed beam headlamp unit according to claim 6 wherein said cover member is polyvinyl chloride and said cured plastic is an acrylic composition.

8. In a sealed beam headlamp unit according to claim 6 wherein said cover has a thickness of about 15 mils.

9. In a sealed beam headlamp unit according to claim 6 wherein said cured plastic material is bonded to said polymeric material cover member.

10. In a sealed beam headlamp unit according to claim 9 wherein the bond of said cover member to said plug and a bond of said cover member to said outer rim of said passageway is effected by a quantity of the cured plastic material extending between the rim and the cover member and extending around a periphery of said cover member.

* * * * *